United States Patent [19]

Komulainen

[11] Patent Number: 4,566,051
[45] Date of Patent: Jan. 21, 1986

[54] INVERTER PROTECTED IN RESPECT OF THE RATES OF INCREASE OF CURRENT AND VOLTAGE

[75] Inventor: Risto Komulainen, Helsinki, Finland
[73] Assignee: Kymi-Stromberg OY, Helsinki, Finland
[21] Appl. No.: 601,626
[22] PCT Filed: Aug. 19, 1983
[86] PCT No.: PCT/FI83/00058
§ 371 Date: Apr. 17, 1984
§ 102(e) Date: Apr. 17, 1984
[87] PCT Pub. No.: WO84/00858
PCT Pub. Date: Mar. 1, 1984

[30] Foreign Application Priority Data
Aug. 19, 1982 [FI] Finland .................................. 822885
[51] Int. Cl.[4] ............................................. H02H 7/122
[52] U.S. Cl. ............................................ 361/13; 361/18; 361/91; 363/55; 363/56
[58] Field of Search ................... 361/2, 8, 13, 18, 91, 361/110, 111; 363/55-58

[56] References Cited
U.S. PATENT DOCUMENTS
4,286,314 8/1981 Molyneux-Berry ................ 363/55
4,378,586 3/1983 Bete ........................................ 363/56
4,403,269 9/1983 Carroll ................................ 363/56 X FOREIGN PATENT DOCUMENTS
9225 3/1982 European Pat. Off. .
2064472 7/1972 Fed. Rep. of Germany .
2090079 6/1982 United Kingdom .

Primary Examiner—Harry E. Moose, Jr.
Attorney, Agent, or Firm—Cushman, Darby & Cushman

[57] ABSTRACT

A single-phase or multi-phase inverter protected with respect to the rates of increase of current and voltage, the said inverter comprising a filter capacitor and a choke protecting with respect to the rate of increase of current, as well as, members protecting with respect to the voltage increase rate. In order for it to be possible to discharge the energy stored in the magnetic field of the choke and in the capacitor, between the change-over steps of the inverter substantially without losses, for each phase, there is a series connection of the capacitor and a diode connected in parallel with only one semiconductor switch and a diode is connected between the connection point between the capacitor and the diode, and one terminal of a storage capacitor. The energy in this way transferred to the separate storage capacitor can then be transferred to the filter capacitor by use of a breaker.

3 Claims, 4 Drawing Figures

INVERTER PROTECTED IN RESPECT OF THE RATES OF INCREASE OF CURRENT AND VOLTAGE

FIELD OF THE INVENTION

The present invention is directed to a single-phase or multi-phase inverter protected with respect to surges or the rates of increase of current and voltage. The inverter comprises a filter capacitor and a choke for protecting with respect to the current, increase rate connected at the DC-side of the inverter. Also provided, for each phase, are at least two controlled semiconductor switches and, connected in parallel with these, members protecting with respect to the voltage increase rate and a separate storage capacitor whose first terminal is connected to either terminal of the filter capacitor, whereas the other terminal is connected to means by which energy is transferred from the storage capacitor to the filter capacitor, as well as to means for transferring energy from the members protecting in respect of the rates of increase of current and voltage to the storage capacitor. The inverter in accordance with the invention is suitable for use as an inverter component of a pulse-width-modulated frequency transformer, by means of which an AC-voltage of desired frequency is formed out of a fixed DC-voltage, or as a step-down transformer of DC-voltage. The controlled semiconductor switch of the inverter may consist of any semiconductor component whatsoever that can be controlled conductive and nonconductive from a control electrode and which requires external limitation of the rate of increase of current and voltage. Such components are, e.g., a bipolar transistor, a power-FET, and a GTO-thyristor.

BACKGROUND OF THE INVENTION

An inverter in accordance with the conventional technology, which is provided with connections limiting the current-increase rate (di/dt) and the voltage-increase rate (du/dt), is illustrated with respect to one phase in FIG. 1. Therein, $U_{DC}$ is the supplying DC-voltage, $C_{DC}$ is the filter capacitor of the DC-voltage, $S_1$ and $S_2$ are semiconductor switches, $D_1$ and $D_2$ are so-called zero diodes, L is the choke limiting the rate of increase of the current, whereas the diode $D_5$ and the resistor $R_3$ constitute an alternative route for the current of the choke, and $C_1$ and $C_2$ are the capacitors limiting the rate of increase of the voltage, whereat diodes $D_3$ and $D_4$ as well as resistors $R_1$ and $R_2$, together with $C_1$ and $C_2$, form so-called polarized RC-shields.

The arrangement of FIG. 1 constitutes a change-over switch by which the poles of the input voltage can be alternately connected to the output pole. The change-over of the switch, e.g., from the lower branch to the upper branch takes place by opening $S_2$, which had been conductive, and by closing $S_1$. Thus, $C_1$, which had been charged to a voltage $U_{DC}$, is discharged through the resistor $R_1$. $C_2$, whose voltage has been zero, is charged along the path $U_{DC}$-L-$S_1$-$D_4$-$C_2$. After $C_2$ has been charged, excess current of the choke L is turned so as to pass vid $D_5$ and $R_3$, being gradually reduced to zero, at which time a stable condition has been reached. The change-over of the switch in the opposite direction takes place in a corresponding way.

The operation of the inverter in accordance with FIG. 1, however, involves the drawback that the energy $\frac{1}{2}CU^2$ of the capacitor protecting with respect to the voltage increase rate, discharged on each change-over of the switch, as well as the energy $\frac{1}{2}LI^2_{max}$ charged in the choke protecting with respect to the current increase rate on swinging of the resonance circuit are converted to heat in the resistors $R_1$, $R_2$ and $R_3$. The power loss is proportional to the number of change-overs of the switches per unit of time, which makes the efficiency of the inverter poor at high (higher than 1 kHz) frequencies.

SUMMARY OF THE INVENTION

The object of the present invention is to provide an inverter in which the energies of the di/dt protective choke and of the du/dt protective capacitor are not dissipated as heat, but they are returned to the filter capacitor of the DC-voltage side of the inverter, so that the efficiency of the arrangement is improved remarkably. According to the invention, this has been accomplished so that the members protecting with respect to the voltage increase rate comprise, for each phase, a series connection of a capacitor and a diode connected in parallel with only one of the controlled semiconductor switches and that the energy transfer means comprises a diode connected between the connection point between the series connected protective capacitor and diode, and the other terminal of the energy transfer diode is and one a terminal of a storage capacitor.

In the case of a three-phase inverter, the inverter is characterized in that the means for transferring energy to a storage capacitor common for all phases comprises diodes connected between the connection points between the series connected protective capacitor and diode for each phase, and the terminal of the storage capacitor.

BRIEF DESCRIPTION OF THE DRAWINGS

The invention will be described in more detail below with reference to the attached drawing, wherein.

DETAILED DESCRIPTION OF THE INVENTION

Figure 1:
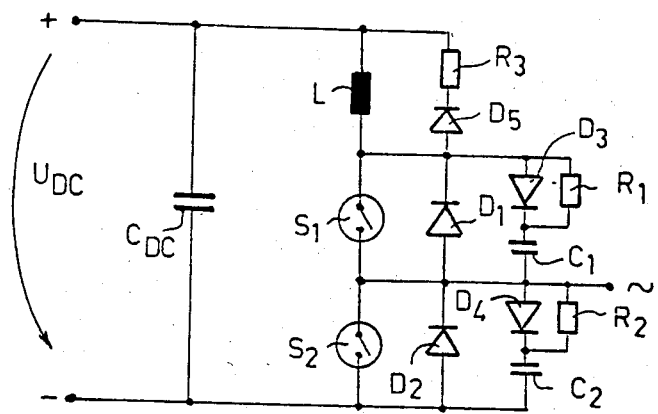
FIG. 1 shows the prior-art inverter already described above.
Figure 2:
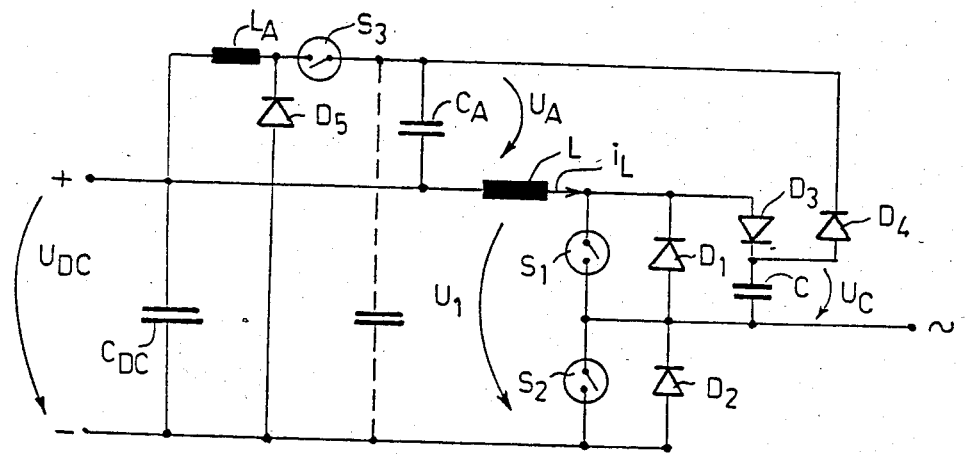
FIG. 2 shows one single-phase embodiment of an inverter in accordance with the invention.
Figure 3:
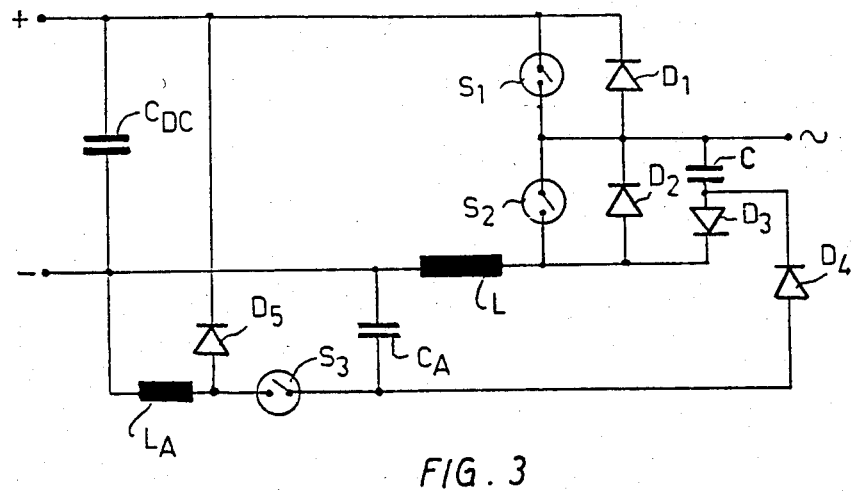
FIG. 3 shows a second single-phase embodiment of an inverter in accordance with the invention.
Figure 4:
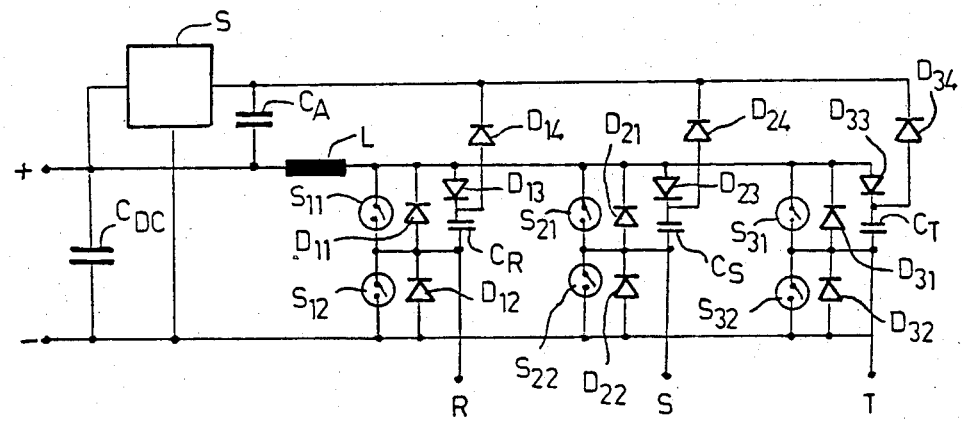
FIG. 4 shows a three-phase inverter formed in accordance with the invention.

In FIGS. 2 to 4, the same reference denotations have been used for corresponding components as were used in FIG. 1, already described above. The arrangement of FIG. 2 differs from that of FIG. 1 in the respect that the protective capacitor $C_2$, the diode $D_4$ and the resistor $R_2$ of $S_2$ have been omitted, so that the capacitor C forms a joint du/dt protective capacitor both for the upper branch and for the lower branch. Moreover, it has been possible to omit the resistor $R_3$ and the diode $D_5$ of the di/dt protective choke L, because the energy of the choke can be discharged through the diode $D_4$ connected to the connecting point between the capacitor C and the diode $D_3$ to a separate storage capacitor $C_A$. Therefore, it has also been possible to omit the resistor $R_1$ of FIG. 1. In the arrangement of FIG. 2, the energies of both the di/dt protective choke L and the du/dt protective capacitor C are, thus, fed through the diode $D_4$ to a separate storage capacitor $C_A$, from which the energy is supplied by means of a separate breaker back to the filter capacitor $C_{DC}$ of the main voltage. Thus, the arrangement includes no resistive components, so that, in principle, it operates without losses. Thus, especially at high change-over frequencies, the overall efficiency of the inverter is essentially improved.

Below, the operation of the inverter is accordance with the invention will be examined on the basis of the exemplifying embodiment shown in FIG. 2. To begin with, it is assumed that $S_2$ is conductive, $U_C = U_{DC} + U_A$, and $i_L = 0$. The changing-over of the switch starts with the opening of $S_2$ and closing of $S_1$. Accordingly, the voltage $U_1$ effective over the connectors $S_1$ and $S_2$ is reduced to zero, because the voltage of C cannot change suddenly. A voltage $U_C$-$U_A$ is effective over the choke L, so that its current starts increasing. Accordingly a resonance circuit L-$S_1$-C-$D_4$-$C_A$ is formed, whose current discharges C and charges $C_A$. The voltage effective over $S_2$ increases at the same rate at which C is discharged. When $U_C$ reaches the value zero, the current $i_L$ is turned so as to pass along the route L-$D_3$-$D_4$-$C_A$, so that it is reduced at the rate $di/dt = U_A/L$. When $i_L$ reaches the value zero, the situation is stable and the switch is in the upper position. From the above it is seen that, during the change-over of the switch, the energies of both C and L were charged in the storage capacitor $C_A$.

The changing-over of the switch from the upper position to the lower position takes place in a corresponding way by opening $S_1$ and by closing $S_2$. Then, also, the voltage $U_1$ collapses to zero, because $U_C$ remained at the value zero after the preceding change-over. Correspondingly, now a resonance circuit L-$D_3$-C-$S_2$-$C_{DC}$ is formed, which charges C. When $U_C = U_{DC} + U_A$, $i_L$ is turned so as to pass along the path L-$D_3$-$D_4$-$C_A$, the current being reduced to zero. In this way the original situation has been reached. It should be stated that it is a prerequisite for operation of the type described above that $U_A$ is lower than $U_{DC}$, because, in the contrary case, the voltage of C, $U_C$, would never reach the value $U_{DC} + U_A$.

In order for the energy charged in the storage capacitor $C_A$ to be transferred to the filter capacitor $U_{DC}$, circuit components have been included in the arrangement for shifting the charge of $C_A$ to $C_{DC}$. This operation can be accomplished by means of a number of prior-art circuit constructions, one of which is shown in FIGS. 2 and 3. It consists of a semiconductor switch $S_3$, a diode $D_5$, and a choke $L_A$, which form a breaker by which it is possible to transfer energy from $C_A$ to $C_{DC}$ to an extent necessary in order to keep the voltage $U_A$ substantially constant.

The operation of the breaker shown in FIGS. 2 and 3 and consisting of the semiconductor connector $S_3$, choke $L_A$, and diode $D_5$ is described in the following. When $S_3$ is conductive, the current of the inductance $L_A$ increases at a rate in accordance with the formula $di/dt = U_A/L_A$, i.e. energy is transferred from the capacitor $C_A$ into the magnetic field of the choke $L_A$. After the current has increased to a certain maximum value, the connector $S_3$ is opened. Then, the current of the choke $L_A$ is shifted to the diode $D_5$ and starts charging the filter capacitor $C_{DC}$. The current of choke $L_A$ is reduced at the rate $di/dt = U_{DC}/L_A$. When the current reaches the value zero, $S_3$ may again be closed if the voltage $U_A$ is higher than the desired value.

In connection with FIG. 2, only one embodiment of the invention has been described. The basic idea of the invention may also be accomplished, e.g., by means of the mirror-image arrangement shown in FIG. 3, which is similar to the arrangement shown in FIG. 2, but therein the di/dt- and du/dt-shields have been shifted to the lower branch of the inverter, so that the directions of the diodes $D_3$, $D_4$ and $D_5$ have been reversed.

The arrangement of FIG. 2 may also be changed so that, the second terminal of the capacitor $C_A$ is connected to the negative terminal of the filter capacitor instead of to the positive terminal of the filter capacitor, as is shown in the FIG. 2 by the broken line.

FIGS. 2 and 3 show single-phase inverters formed in accordance with the invention. The invention can also be applied to a three-phase inverter, as is shown in FIG. 4. From FIG. 4 it is seen that for all phases it is possible to use a common di/dt protective choke L and a common storage capacitor $C_A$. In FIG. 4, the breaker for transferring the energy of the capacitor $C_A$ to the capacitor $C_{DC}$ is denoted with reference denotation S. The breaker S may be similar to the breaker shown in FIGS. 2 and 3, consisting of switch $S_3$, choke $L_A$ and diode $D_5$.

As was already mentioned above, the arrangement in accordance with the present invention is also suitable for use as a step-down transformer, i.e. as a so-called DC/DC-transformer. In such a case, however, e.g., the arrangement of FIG. 2 must be completed by, to the point denoted as the AC-voltage outlet in FIG. 2, connecting a series choke and a parallel capacitor for the filtration of the DC-voltage formed, which is lower than the input voltage. It should be stated that in such a DC/DC-transformer the direction of flow of the current may also be reversed, in which case the arrangement functions as a step-up transformer of DC-voltage.

When the preceding description and the attached patent claims and drawing are being interpreted, it should be taken into account additionally that in this connection, the components denoted as diodes are not to be understood as meaning a conventional diode alone, but they mean any component whatsoever conductive in one direction only, such as, e.g., a transistor connected as a diode.

I claim:

1. An inverter protected from surges of current and voltage, in which said surges represent changes in the rates of increase of current and voltage, said inverter comprising:
   first circuit means comprising a filter capacitor and a choke for protecting said inverter from said current and voltage surges;
   at least two controlled semiconductor switches for each phase of said inverter coupled to said first circuit means;
   second circuit means, comprising a series connected capacitor and diode, for each phase of said inverter for protecting against voltage surfaces, said second circuit means for each phase of said inverter being connected in parallel with one of said at least two controlled semiconductor switches for each phase of said inverter;
   storage means, comprising a storage capacitor, for storing energy resulting from said current and voltage surges, said storage means being connected to said first circuit means;
   energy transfer means, for each phase of said inverter, for transferring energy from said storage means to said filter capacitor of said first circuit means, said energy transfer means comprising a diode connected between the connection point of said series connected capacitor and diode and said storage capacitor; and breaker means coupled to each of said energy transfer means for regulating the transfer of energy between said storage means to said filter capacitor.

2. An inventor as in claim 1, comprised of a single phase.

3. An inverter as in claim 1, comprised of three phases.

* * * * *